Oct. 3, 1933.   T. C. MANNING   1,928,903
APPARATUS FOR TREATING MATERIAL
Filed April 27, 1931
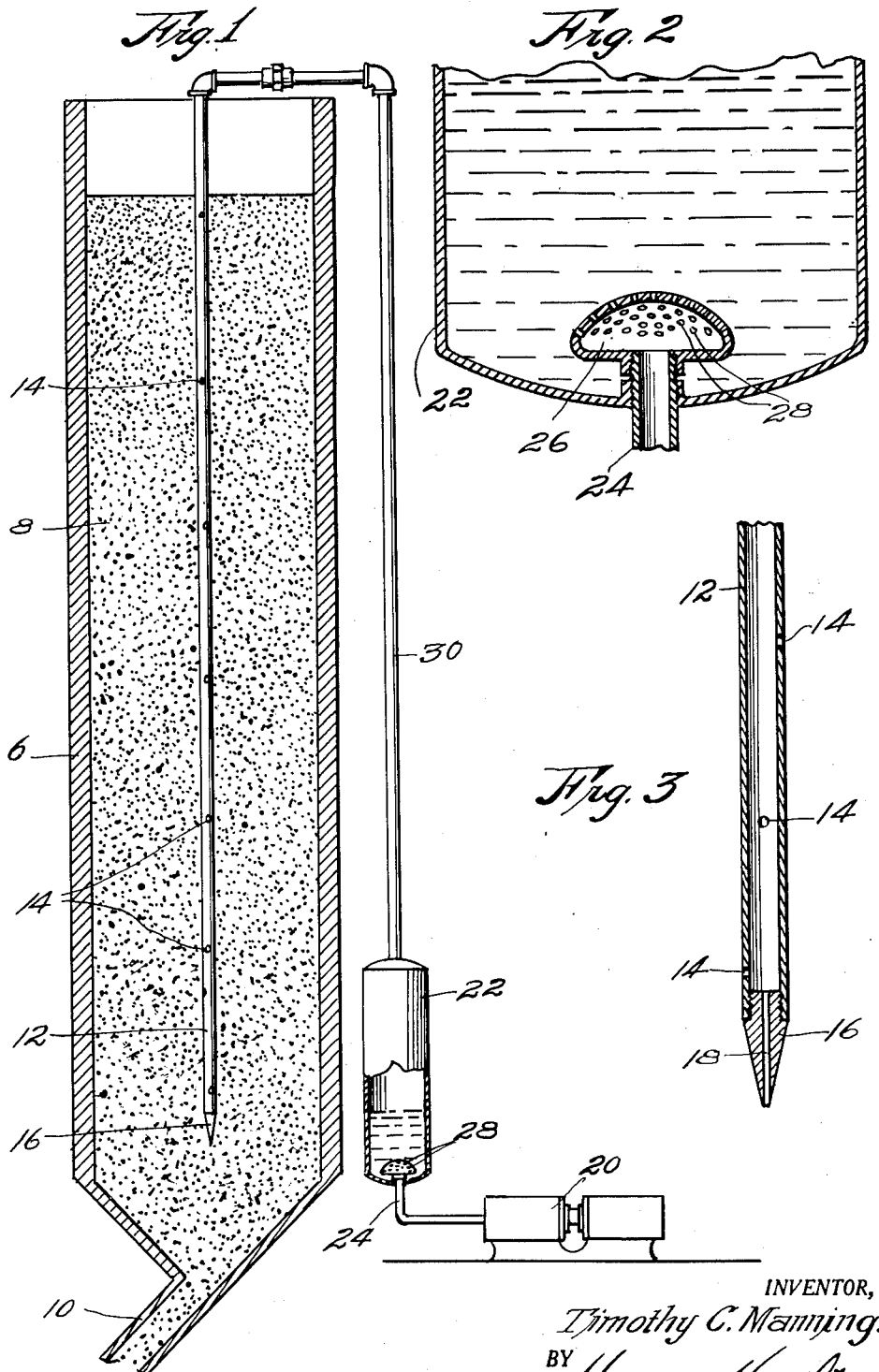
INVENTOR,
Timothy C. Manning.
BY
Hovey & Hamilton,
ATTORNEYS.

Patented Oct. 3, 1933

1,928,903

UNITED STATES PATENT OFFICE 1,928,903

APPARATUS FOR TREATING MATERIAL

Timothy C. Manning, Kansas City, Mo.

Application April 27, 1931. Serial No. 533,143

3 Claims. (Cl. 167—3)

This invention relates to the art of treating grain and particularly a mass of grain stored in bins, piles, or in a similar manner, and the primary object of the invention is the provision of a novel method and apparatus for the performing of such inventive concepts through the use of effective and simple apparatus susceptible of performing the method contemplated.

One of the objects of the instant invention is the provision of apparatus for applying disinfectant to all parts of a mass of grain, which includes introducing disinfectant laden air to said mass at predetermined points therein.

The method contemplated by this invention includes the steps of first compressing a column of air; breaking said column into jets within a tank of treating liquid where the air is saturated; conducting the compressed disinfectant laden air to points within a mass of grain and there liberating the same in the form of spaced apart jets, whereby the interstices throughout the mass are completely filled with an effective disinfectant which acts upon substantially every grain constituting the mass.

Details of construction forming a part of the treating apparatus embody other objects of this invention and modifications as to the method and refinements of practicing the same are possible without departing from the broad concepts thereof.

One embodiment of the invention is illustrated in the accompanying drawing, wherein:

Figure 1 is a diagrammatical view of a grain bin having associated therewith treating apparatus made in accordance with this invention.

Fig. 2 is an enlarged, fragmentary, vertical, central section through the lower portion of the air saturating tank, and, Fig. 3 is an enlarged, vertical section through the end of the compressed air conduit illustrating spaced apart jets, through which disinfectant is introduced to the grain.

The method of disinfecting a mass of grain will be set down after the preferred form of apparatus is described.

In the drawing, like reference characters refer to similar parts throughout the several views and the numeral 6 indicates a bin which may be of any size or shape, so long as the same is used to store a mass of grain 8 therein. The well known outlet 10 may be provided as a part of bin 6 and in the instance illustrated, it will be assumed that bin 6 is cylindrical in cross section. In storage bins of this character the grain oftentimes is at a very high temperature. Weevils and objectionable insects which multiply as the temperature rises are oftentimes present in the grain when introduced to bin 6 and if grain 8 is left a great length of time, parasitic life, such as these weevils, destroy the value of the grain. It is customary to introduce disinfectant to a bin of grain by pouring a quantity into bin 6 at the top thereof and directly on to the mass of grain 8. Gasifying takes place and gravity, together with the heavier-than-air characteristic of the gas, causes the liquid and gas respectively to pass down into mass of grain 8. Where bin 6 is of any size, the grain at the top is properly treated, while the grain at the bottom practically never receives the disinfectant in either form mentioned.

In accordance with the object of this invention, therefore, there is provided a conduit 12 which extends practically the full length of bin 6 and which is provided with a series of holes 14. These holes 14 are spaced apart along the length of conduit 12 where it passes through grain 8, and may be altered as to number in accordance with conditions. The lowermost end of conduit 12 is provided with a plug 16, having a drain opening 18 therethrough, which allows the escape of any collected liquid. Compressed air, laden with disinfectant, is forced through holes 14 into the interstices within the mass of grain 8.

To carry out this feature of the invention, it is necessary to provide means such as a pressure pump 20 to create a column of air under pressure. This column of air is conducted to tank 22 through pipe 24, where the same is broken into a large number of jets through the intermediacy of head 26, having perforations 28 formed therein, as illustrated in Fig. 2. Tank 22 contains a liquid disinfectant of ordinary character, such as carbon bisulphide and tetrachloride, and as this liquid is churned and agitated by the jets of air forced through perforations 28, the air becomes laden practically to the point of saturation with disinfectant. This laden air then passes from tank 22 to conduit 12 through a connecting pipe 30 and escapes as before mentioned through holes 14.

This method, manifestly, releases air under pressure into bin 6 and if the temperature if the mass of grain 8 therein is excessively high, the air therein will be changed and thereby the temperature lowered.

This apparatus also sets up a circulation through the mass of grain 8 which is beneficial to any material stored in a manner described. Variations of the method contemplated and modifications of the apparatus described might be made without departing from the scope of the appended claims.

Having thus described the invention, what is claimed as new and desired to be secured by Letters Patent is:

1. Apparatus for disinfecting grain comprising, in combination, a grain bin; a compressor, a tank for liquid disinfectant; a perforated head within said tank at the lowermost part thereof; a pipe establishing communication between compressor and perforated head; a vertically disposed centrally located length of conduit within said bin; and a series of holes formed through said conduit, said conduit extending into said bin from the top thereof and terminating in spaced relation to the bottom of said bin.

2. In apparatus for disinfecting grain, a grain bin; a compressor; a tank for liquid disinfectant; a conduit extending downwardly into said bin from the top thereof; a pipe connecting the compressor tank and conduit to form a continuous system; a series of holes formed through the side of said conduit; and a plug at the free end of said conduit, said plug having a drain opening therethrough whereby to free said conduit of disinfectant not passing therefrom through said holes.

3. Apparatus for disinfecting grain comprising, in combination, a grain bin; an air compressor; a tank for liquid disinfectant; a perforated head within said tank at the lowermost part thereof; a pipe establishing communication between compressor and perforated head; a vertically disposed length of conduit within said bin having a series of holes formed through the wall and directed radially whereby to cause the disinfectant forced therethrough to be projected horizontally; a pipe connecting the conduit and said tank; and a removable plug, having a longitudinal drain opening formed therethrough, in the lowermost end of said length of conduit, said holes being spaced apart predetermined distances, the action of gravity carrying the disinfectant from the plane of the hole from which it was sprayed downwardly to the next succeeding hole, said conduit being drained of all disinfectant not forced through the said series of holes by said drain opening, the same being at the lowermost portion of said conduit.

TIMOTHY C. MANNING.